Feb. 27, 1934.   J. H. WALKER   1,948,893
FLUID TREATING SYSTEM
Filed July 21, 1930
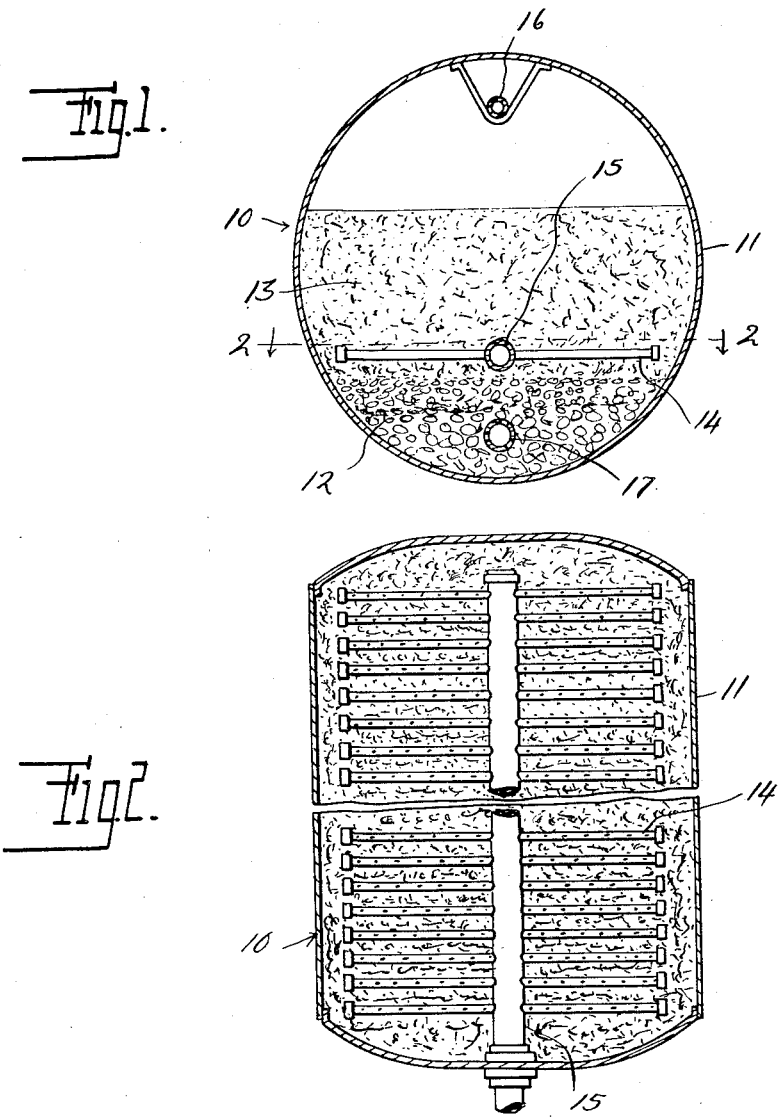
INVENTOR
James H. Walker
BY Whittemore Hulbert Whittemore
& Belknap   ATTORNEYS Patented Feb. 27, 1934

1,948,893

UNITED STATES PATENT OFFICE 1,948,893

FLUID TREATING SYSTEM

James H. Walker, Detroit, Mich., assignor to The Detroit Edison Company, Detroit, Mich., a corporation of New York Application July 21, 1930. Serial No. 469,536

7 Claims. (Cl. 210—24)

This invention relates generally to fluid treating systems and refers more particularly to fluid softening and filtering systems.

The invention concerns itself still more particularly with that type of fluid softening apparatus wherein fluid is caused to flow upwardly from a suitable manifold through a base exchange mineral capable of removing the scale forming materials from the fluid as the latter passes through the same to the distributing line. In systems of the general type specified above as now commercially produced, the base exchange mineral is supported upon a bed of finely graded gravel disposed above the fluid discharge manifold with the result that the fluid is compelled to flow through the gravel prior to reaching the base exchange mineral. While the above arrangement has met with a certain degree of success in the trade, nevertheless, it is objectionable since there is a tendency for the gravel bed to become disturbed by the flow of fluid upwardly therethrough causing the base material which is of a much finer texture than gravel to mix with the latter and thereby reduce the efficiency of the apparatus and also the ability of the gravel bed to support the finely divided base exchange mineral, with the result that the mineral is gradually carried away through the drain pipe.

The present invention contemplates improving the construction briefly outlined above by arranging the fluid discharge manifold directly beneath the base mineral so that the fluid flows directly from the manifold through the base material to the distributing line.

A further advantageous feature of the present invention resides in the provision of means disposed substantially below the fluid discharge manifold for draining the apparatus. The construction is such that when it is desired to regenerate the base exchange mineral, the regenerating fluid may be discharged into the apparatus through the distributing line and caused to flow downwardly through the base material to the draining means, set forth above, as distinguished from the conventional type of construction wherein the regenerating fluid is drained out of the apparatus through the fluid discharge manifold.

With the foregoing as well as other objects in view, the invention resides in the novel details of construction which will be made more apparent as this description proceeds, especially when considered in connection with the accompanying drawing, wherein:

Figure 1 is a cross-sectional view through a fluid softening apparatus constructed in accordance with this invention; and Figure 2 is a sectional view taken substantially on the line 2—2 of Figure 1.

Referring now more in detail to the drawing, it will be noted that there is illustrated in Figure 1 a fluid treating apparatus 10 comprising a cylindrical tank 11 containing a filtering material such, for example, as a bed of gravel 12 and a base exchange mineral 13 above the gravel 12 and supported thereby. The gravel forming the bed 12 is preferably finely graded so that any liability of the base mineral 13 to intermingle or mix with the gravel is reduced to the minimum. In other words, the particles forming the gravel bed gradually decrease in size from the bottom of the bed to the top thereof with the result that the top surface of the bed is composed of extremely fine gravel sufficient to form an adequate support for the base exchange material and to prevent the latter from mixing with the gravel. The base exchange mineral 13 may be any substance having the properties of removing the scale forming materials from water or other fluid passed therethrough.

In order to discharge the fluid to be treated through the base exchange mineral, I provide a fluid discharge manifold 14 arranged within the tank 11 adjacent the bottom of the bed of base exchange mineral and slightly above the gravel 12. The manifold 14 comprises a plurality of conduits having perforations in the upper sides thereof and communicating with a suitable fluid supply line 15. The construction is such that fluid flowing through the supply line 15 is discharged through the perforations aforesaid in the manifold and caused to flow upwardly through the bed of base exchange mineral 13 to the fluid distributing line 16 communicating with the tank 11 adjacent the top thereof. In this connection it is to be noted that during the operation of the apparatus the fluid discharged by the manifold flows directly into the base exchange mineral with the result that there is no tendency for this fluid to disturb the bed of gravel and thereby cause the exchange mineral to mix with the gravel. The above feature is important since a mixing of the base exchange mineral with the gravel reduces the active quantity of mineral and as a consequence affects the efficiency of the device.

Embedded within the gravel 12 in the lower portion of the tank 11 is a drain conduit 17 having a plurality of perforations therein for receiving fluid from the tank and conveying the same to a point exteriorly of the tank. The drain conduit 17 finds particular utility when it is desired to regenerate the base exchange mineral for draining the regenerating fluid from the tank. The regenerating fluid such as brine or the like may be introduced into the tank through the distributing line 16 and drawn through the base exchange material 13 and through the drain conduit 17. Thus, it will be observed that with my improved apparatus, as outlined above, it is not essential to utilize the fluid discharge manifold for withdrawing the regenerating fluid out of the tank. Moreover, the arrangement is such that the pipe 16 instead of pipes 15 and 17 could serve alternately as an inlet for the untreated fluid during the softening operation and as an outlet for the regenerating solution during regeneration; that the pipe 17 instead of pipe 16 could serve as an outlet for the treated fluid during the softening operation; and that pipe 15 instead of pipe 16 could serve as an inlet for regenerating solution, all without any change or modification in construction and without any danger of the gravel bed becoming disrupted.

What I claim as my invention is:

1. In a fluid treating system, a container, a gravel bed, a layer of base exchange material supported by said gravel bed, an outlet pipe embedded in the gravel bed below the top thereof, a pipe in the upper portion of the container adapted to be used both for fluid treating and for base regeneration, and an inlet pipe located between the gravel bed and the layer of base exchange material.

2. In a fluid treating system, a container, a layer of gravel within said container, a base exchange material supported by said gravel, and three pipes extending into and having openings within said container, one of said pipes being embedded in the layer of gravel, another of said pipes being adjacent the bottom of the base exchange material and slightly above the gravel, and the third pipe being above the base exchange material.

3. In a fluid treating system, a closed container, a layer of gravel upon the bottom of said container, a base exchange material upon and supported by said gravel in spaced relation to the top of said container, and three pipes extending into and having openings within said container, said pipes being disposed one above the other and respectively embedded in the gravel adjacent the bottom of the container, in the base exchange material slightly above the gravel, and in the space within the container above said base exchange material.

4. In a fluid treating system, a container, a layer of gravel within said container, a base exchange material supported by said gravel, the area of said material being at least as large as the area of the gravel, the particles forming the gravel gradually decreasing in size from the bottom to the top of said layer, and three pipes extending into and having openings within said container, one of said pipes being embedded in the layer of gravel, another of said pipes being adjacent the bottom of the base exchange material and slightly above the gravel, and the third pipe being above the base exchange material.

5. In a fluid treating system of the class described, a container, a layer of gravel arranged within the container, a base exchange material supported by said gravel, a fluid discharge manifold disposed between said gravel and said base exchange material adapted to discharge fluid to be treated upwardly through said base exchange material, an outlet port arranged above said fluid discharge manifold and adapted to revert a regenerating solution, and means for withdrawing the regenerating fluid out of the tank comprising a drain conduit embedded within the gravel.

6. In a fluid treating system of the class described, a container, a bed of gravel arranged within and supported by the bottom of said container, a quantity of fluid treating material supported by said gravel, a fluid discharge manifold disposed at the base of said fluid treating material and adapted to discharge the fluid upwardly therethrough, an outlet port arranged above said fluid discharge manifold and adapted to revert a regenerating solution, and drainage means for the container embedded in the gravel adjacent the bottom of the container.

7. In a fluid treating system of the class described, a container, a bed of gravel arranged within the container, a fluid treating material supported by said gravel, a fluid discharge manifold disposed at the bottom of the fluid treating material and adjacent the top of the gravel to discharge a fluid to be treated upwardly through said fluid treating material, an outlet conduit arranged above said fluid treating material for distributing the treated fluid, said outlet conduit adapted to be reverted to discharge a regenerating solution, and a drain conduit arranged diametrically opposite said outlet conduit for withdrawing said regenerating solution.

JAMES H. WALKER.